(12) United States Patent
Liet

(10) Patent No.: US 10,806,171 B2
(45) Date of Patent: Oct. 20, 2020

(54) FODDER MIXING WAGON

(71) Applicant: Trioliet B.V., Oldenzaal (NL)

(72) Inventor: Cornelis Hendricus Liet, Losser (NL)

(*) Notice: Subject to any disclaimer, the term of this patent is extended or adjusted under 35 U.S.C. 154(b) by 289 days.

(21) Appl. No.: 15/818,399

(22) Filed: Nov. 20, 2017

(65) Prior Publication Data
US 2018/0160718 A1    Jun. 14, 2018

(30) Foreign Application Priority Data

Dec. 8, 2016 (DE) .................... 20 2016 106 837 U

(51) Int. Cl.
| | |
|---|---|
| A23N 17/00 | (2006.01) |
| A01K 5/00 | (2006.01) |
| B01F 7/00 | (2006.01) |
| B01F 7/16 | (2006.01) |
| B01F 7/24 | (2006.01) |
| B01F 13/00 | (2006.01) |
| B01F 15/00 | (2006.01) |

(52) U.S. Cl.
CPC ........... *A23N 17/007* (2013.01); *A01K 5/004* (2013.01); *B01F 7/00416* (2013.01); *B01F 7/162* (2013.01); *B01F 7/242* (2013.01); *B01F 13/004* (2013.01); *B01F 15/00305* (2013.01); *B01F 2215/0024* (2013.01)

(58) Field of Classification Search
CPC .............. A01K 5/004; A23N 17/007; B01F 2215/0024; B01F 7/00416; B01F 7/162; B01F 7/242; B01F 13/004; B01F 15/00305
See application file for complete search history.

(56) References Cited

U.S. PATENT DOCUMENTS

| | | | |
|---|---|---|---|
| 6,885,003 B1 | 4/2005 | Dubernet | 250/339.09 |
| 7,428,042 B2 | 9/2008 | Ghiraldi | 356/73 |
| 8,651,730 B2 | 2/2014 | Barbi | 366/141 |
| 9,091,644 B2 | 7/2015 | Mazeris | G01N 21/359 |
| 2012/0312240 A1* | 12/2012 | Bachman | A01K 5/001 119/51.01 |
| 2016/0144325 A1 | 5/2016 | Bresciani | B01F 15/00259 |

FOREIGN PATENT DOCUMENTS

| | | |
|---|---|---|
| DE | 202010005053 | 8/2011 |
| DE | 102010033886 | 2/2012 |
| DE | 102010033888 | 2/2012 |

(Continued)

OTHER PUBLICATIONS

DE102010033886 Machine Translation (Year: 2012).*
Search Report dated Mar. 15, 2018 in corresponding European application 17189392.8, 3 pages.

*Primary Examiner* — Anshu Bhatia
(74) *Attorney, Agent, or Firm* — Fattibene and Fattibene LLC; Paul A. Fattibene

(57) ABSTRACT

A fodder mixing wagon, comprising a mixing container containing a mixing device, which is adapted to be driven in a mixing process of at least two fodder components, and at least one electronically operable sensor system having a head and used for determining fodder values of at least one fodder component, the head is arranged such that it is operable in the interior of the fodder mixture during the mixing process for determining fodder values of all loaded fodder components and/or the mixing accuracy of the fodder mixture.

17 Claims, 6 Drawing Sheets

(56) References Cited

FOREIGN PATENT DOCUMENTS

| | | |
|---|---|---|
| EP | 1577663 | 9/2005 |
| EP | 1886556 | 2/2008 |
| EP | 1889538 | 2/2008 |
| EP | 2377392 | 10/2011 |
| EP | 3025776 | 6/2016 |
| WO | WO 01/14857 | 3/2001 |
| WO | WO 2013095281 | 6/2013 |

* cited by examiner

FODDER MIXING WAGON

FIELD OF THE INVENTION

The present invention relates to a fodder mixing wagon and mixing of at least two fodder components.

BACKGROUND OF THE INVENTION

In the case of a fodder mixing wagon of the generic kind according to DE 102010033888 A1, the head of the sensor system is arranged in a fodder component loading unit, so as to determine fodder values only of the respective fodder component to be loaded and control then the respective loading process in interaction with a weighing unit.

EP 1577663 A discloses a fodder sensor for self-propelled fodder loading units, which is operable to determine fodder values of only one respective fodder component for the fodder mixture and which, in so doing, cooperates with the weighing unit.

In the case of a fodder mixing unit known from EP 2377392 A, a sensor system is arranged and operable such that fodder values of only one respective fodder component to be loaded are determined, in cooperation with a weighing unit.

Also from EP 1886556 A it is known that, by means of a sensor, fodder values of only one fodder component are determined prior to mixing this fodder component with another fodder component.

From EP 1889538 A it is known that fodder values in a fodder mixture, which is already a finished mixture, are determined and that discrete rations for feeding are apportioned depending on the fodder values determined.

In this context, the sensor records e.g. NIR light waves reflected by the fodder components and evaluates them spectroscopically (near infrared), as known e.g. from WO 01/14857 A.

In the case of the fodder mixing wagon according to DE202010005053 U1, the mixing accuracy is determined e.g. by an NIR sensor system whose head scans the surface of the fodder mixture in the container in a contact-free manner during the mixing process and terminates the mixing process as soon as measurement values no longer fluctuate or fluctuate hardly any longer. The sensor system may alternatively also be operated with image processing or thermal image processing, sound and oscillation processing, radiation or radioactivity or magnetic resonance. The sensor system must be able to quantitatively identify at least two different fodder components in the measuring range and/or to indicate a characteristic of the fodder mixture changing with the mixing accuracy or to detect a homogeneous distribution of a characteristic of a fodder component in the mass of the fodder mixture.

SUMMARY OF THE INVENTION

It is the object of the present invention to improve a fodder mixing wagon of the type referred to at the beginning, such that at least fodder values in the fodder mixture can be determined during the mixing process, without the necessity of analyzing each fodder component separately prior to the mixing process, and such that the loading and mixing process can be controlled more efficiently.

This object is achieved by the features of embodiments of the invention.

Since, according to one embodiment, the head (pick-up head) of the at least one sensor system is operable in the interior of the fodder mixture in the mixing container, it will determine fodder values of all fodder components of the fodder mixture, without the necessity of separately analyzing each fodder component in advance, whereby meaningful information on current fodder values will be available at any time during the mixing process. The loading process and the mixing process can thus be controlled systematically. The sensor system is here configured as a combination sensor system by means of which fodder values as well as the mixing accuracy can be determined in the fodder mixture consisting of the mixed fodder components. By determining the mixing accuracy, e.g. on the basis of decreasing fodder-value fluctuations, a moment in time for stopping the mixing process, preferably with a certain tolerance range, can be set as soon as no fluctuations, or only insignificant residual fluctuations of the fodder values and measurement results occur. According to an expedient embodiment, only one sensor system is installed. Alternatively, more than one sensor system or more than one head may be used. In this case, measurement values may be averaged in an expedient manner.

When, according to another embodiment, the head of the at least one sensor system is arranged in the mixing container on the rotatingly driven mixing device, for rotation together with the latter, on a measuring site, which is purposefully chosen for obtaining optimum measurement values, in the interior of the fodder mixture, close contact with the fodder mixture will always be guaranteed during the mixing process, so as to procure correct, current measurement results. The fodder values determined can be processed in various ways. Either the fodder values are used as a basis for determining and supervising the respective amount of each fodder component to be added during the mixing process, or decreasing changes of the head-determined fodder values during the mixing process are used as a basis for supervising the mixing accuracy until the mixing process and/or the adding of a fodder component is/are stopped. Hence, the mixing device has arranged thereon a head of a fodder-value sensor system or a head of a mixing-accuracy sensor system, or both said heads are arranged on the mixing device. Of course, the sensor system or the sensor systems also allow/s to realize both courses of action in common or in succession. The loading process and the mixing process can be controlled efficiently in this way.

According to an expedient embodiment, the sensor system is an NIR sensor system responding to reflected NIR light waves, the head of said sensor system being, expediently, in contact with the fodder mixture or viewing the interior of the latter during the mixing process. The operating principle of NIR sensors is known and will therefore not be explained in detail. Alternatively, also other types of sensors may, however, be used for this purpose. Even sensors operating in a contactless fashion, without contacting the fodder mixture, are imaginable.

According to an expedient embodiment, the mixing accuracy is supervised either on the basis of fodder-value fluctuations or through image processing by means of a further head. In the last mentioned case, the mixing device has so to speak provided thereon separate fodder-value and mixing-accuracy sensor heads and, where appropriate, two separate sensor systems are provided.

According to an expedient embodiment, the head of the sensor system, which is preferably equipped with an analysis computer and/or a battery, is connected, via a Bluetooth or WiFi transmitter module arranged near or in the head and a wireless radio signal link, preferably a Bluetooth or WiFi connection, to a receiver positioned outside the container, said receiver being e.g. a WiFi or Bluetooth module communicating with a cloud or a smart phone, by way of example. In the cloud e.g. the measurement values determined are analyzed. The result of the analysis is retransmitted to the fodder mixing wagon, where it is taken into consideration when the fodder component or fodder components are loaded or when the type of fodder component or fodder components is selected. According to an important aspect of the present invention, one fodder component loaded into the mixing container may here first be examined and evaluated, before a further fodder component will be added, and, if necessary, still another one, and, if necessary, still further fodder components will be added. In so doing, it is always the fodder mixture in its entirety that is analyzed in the container and the further addition of respective fodder components is controlled.

The battery, which is used for the head, may be replaceable. However, it will be expedient to use a battery that is rechargeable, e.g. via a slip-ring connection and a generator arranged on the fodder mixing wagon, or, even more advantageously, in a wireless fashion.

With respect to an operation that should be automated to the highest possible degree, it will be expedient when the sensor system is linked to a computerized control and/or a weighing computer, so that the amounts and/or types of fodder components loaded during the mixing process can be adapted via the control and the weighing computer, respectively, to the fodder values determined, preferably even until the predetermined mixing accuracy has been determined.

According to an expedient embodiment, fodder values of the fodder mixture, which are determined via the control and the weighing computer, respectively, are compared during the mixing process with measurement data of the weighing computer that are representative of the amount of fodder mixture contained in the mixing container. In this way, it will always be known whether or not another sub-quantity will have to be loaded, and/or whether a change to a further or to the preceding fodder component should take place or whether such a further or such a preceding fodder component should be resorted to.

It will be particularly expedient when the fodder mixing wagon is part of an automatic feeding system, which is controllable at least on the basis of the fodder values or the mixing accuracy ascertained during the mixing process.

According to an expedient embodiment, the at least one mixing device is a mixing screw with at least one bottom-side take-up plate or agitator blade, a screw helix and, preferably, a screw core tube. The head of the sensor system may, with its battery and its transmitter module, be arranged on or in the take-up plate or the agitator blade or on the screw helix or on the screw core tube, preferably in an area beginning close to the bottom of the mixing container and extending over the lower third of the screw height. This positioning of the measuring site guarantees that even in the event that the mixing container contains only a small amount of fodder mixture, the fodder mixture will move past the head of the sensor system and will be analyzed correctly. The driven mixing device may differ from a vertical mixing screw (e.g. a horizontal mixing screw, a paddle mixer, chains, etc.).

According to an expedient embodiment, the head includes a transparent disc, preferably made of glass, acrylic glass or bullet-proof glass, which is positioned on the measuring site such that it is flush with or countersunk relative to or raised above the surface contacted by the fodder mixture, the battery and the transmitter module being expediently arranged near the measuring site, but on the back of the mixing device or of the container wall or of the bottom facing away from the surface, so as to prevent any major negative influence on the flow of the circulating fodder mixture.

According to an expedient embodiment, the head is spaced apart from the maximum outer diameter of the mixing screw at a distance corresponding to approximately one third or more of the maximum outer diameter. This positioning of the measuring site guarantees excellent measurement values.

If the head is arranged on an agitator blade or a take-up plate of the mixing screw, it may be arranged either in a part ascending in the direction of rotation of the mixing screw or in a part descending in said direction of rotation.

Finally, it will be expedient when the fodder mixing wagon is adapted to be automatically operated in a self-propelled, stationary, self-loading fashion, or is pushed or pulled, and when it comprises for the weighing computer weighing cells, at least one discharge opening, and, where appropriate, a fodder-component loading unit.

BRIEF DESCRIPTION OF THE DRAWINGS

Embodiments of the subject matter of the present invention are explained making reference to the drawings, in which.

DETAILED DESCRIPTION OF THE INVENTION

Figure 1:
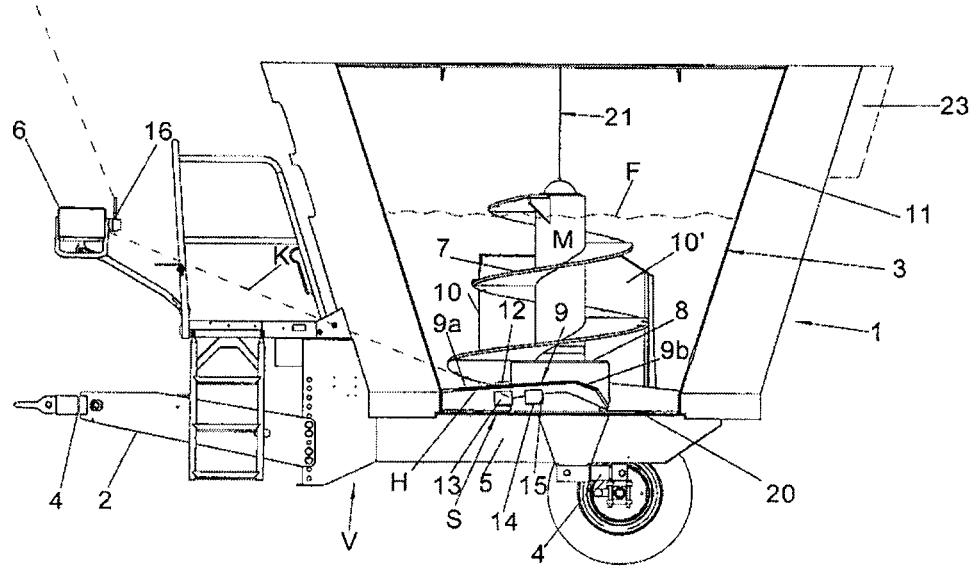
FIG. 1 shows an axial section of an embodiment of a fodder mixing wagon.

The present invention will be explained hereinafter on the basis of a fodder mixing apparatus V configured in FIGS. 1 to 6 as a fodder mixing wagon 1. The fodder mixing wagon 1 is maneuverable e.g. on a drawbar 2 or self-propelled, e.g. in front of feeding sites, or it is used in a stationary manner. However, the present invention is not limited to a fodder mixing wagon 1, but may comprise any type of fodder mixing apparatuses, e.g. self-loading or self-propelling mixing wagons or an automatic feeding system, which has the fodder mixing wagon incorporated therein, and mixing wagons with or without a loading unit, comprising one or a plurality of mixing devices M. The respective mixing device M need not, as shown, consist of a mixing screw comprising at least one helix 7, a core tube 8 and two take-up plates 9 or agitator blades displaced relative to one another by approx. 180° and arranged close to a bottom 20 of a mixing container 3, but also other types of driven mixing devices in at least one mixing container 3 may be used.

In the embodiment shown, the mixing container 3, which may e.g. have the shape of an oval cone, is mounted on a substructure 5 via weighing cells 4. The weighing cells 4 are connected, e.g. by a wireless or a wired connection, to a weighing computer 6, which may have arranged thereon a WiFi or Bluetooth module 16 that may communicate with a cloud, a smart phone or the like, e.g. in a wireless fashion.

The mixing container 3 is e.g. open at the top so as to be loaded with at least two fodder components, from which the mixing device M forms, by rotating about a substantially vertical axis, a fodder mixture F, in which a predetermined mixing accuracy must be achieved before rations are discharged through a discharge opening 10 that is adapted to be exposed by means of a closure 10'. This mixing accuracy is achieved by the driven mixing device M. A plurality of mixing devices may be provided. The individual fodder components are loaded e.g. one after the other, e.g. from above with a shovel loader, and mixed in the fodder mixture F. This is done e.g. with the aid of the weighing computer 6, which measures and/or requests amounts to be loaded.

The gist of the invention is at least one sensor system S installed in the interior of the fodder mixing wagon 1 and having the function of determining at least fodder values in the fodder mixture F during the mixing process. In addition, the sensor system S may be configured and operated as a combination sensor system, which ascertains the fodder values as well as the mixing accuracy in the interior of the fodder mixture F and which is e.g. capable of stopping the mixing process when, by way of example, a homogeneous distribution of the fodder constituents in the fodder mixture has been reached, represented by no fluctuation, or an only insignificant residual fluctuation of the fodder values in the fodder mixture.

The term fodder values relates e.g. to the nutrient composition and, possibly, to the nutrient concentration in the fodder mixture, the content of water and/or dry matter, starch, protein, raw protein, fibers and various other chemical elements, which should be contained in an optimum composition and/or in optimum amounts for the productive livestock in the final fodder mixture to be discharged.

For example, the sensor system S first determines fodder values of a batch of a first fodder component and, subsequently, a further fodder component is loaded and mixed-in via the weighing computer 6, and, after a renewed determination of the current fodder values, the amount of the second or even that of the first fodder component is adapted, or a further or the same fodder component is loaded and mixed-in through the weighing computer 6, and only then at least one further fodder component will follow in the same way, etc.

A practice-oriented course of action may be as follows:

The operator loads a suggested amount of roughage (grass or hay or corn or some other cost-efficient nutrient) into the mixing container 3, mixes and waits for a fodder value result determined by the sensor system S. This will support him in his decision whether, and if so, how much roughage has to be added or whether, and if so, how much expensive concentrated feed and/or other secondary products (e.g. spent grains, beet pulp, etc.) has/have to be added and mixed-in, so as to achieve, in the final analysis, the desired composition in the fodder mixture with a reasonable expenditure. In the course of this process, the sensor system S (in FIGS. 5 and 6 even a further head H') determines continuously or at intervals the result of the mixing process.

In the embodiments shown, at least one head H of the sensor system S is provided on the rotatingly driven mixing device M such that it rotates together therewith and installed such that, during the mixing process, it will be in close contact with the fodder mixture F or scan the fodder mixture F in the interior thereof.

Figure 6:
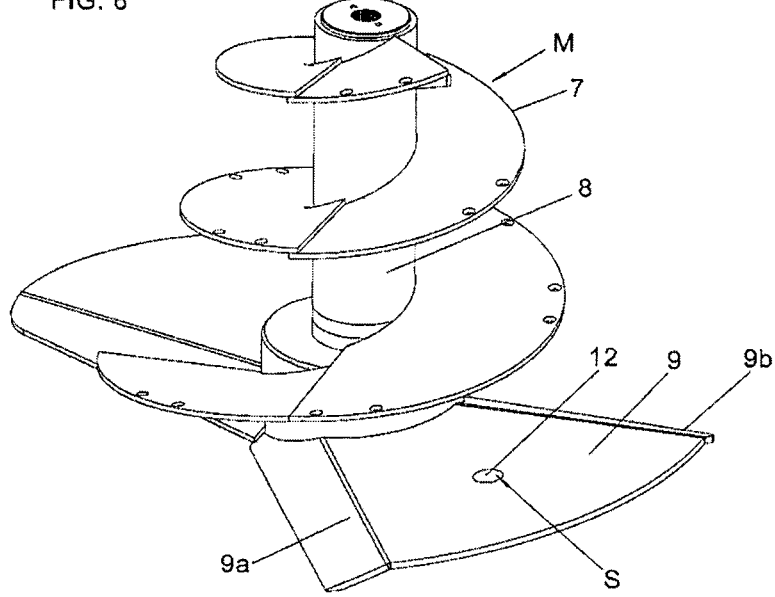
FIG. 6 shows a perspective detail view of a possible embodiment of a mixing device.

The take-up plate 9 or the agitator blade of the mixing device M, which is here shown as a vertical mixing screw and rotatingly driven clockwise in FIG. 6, has an ascending part 9a constituting the leading end in the direction of rotation and a descending part 9b constituting the trailing end in the direction of rotation.

In FIG. 1, the head H is installed on the ascending part 9a such that the fodder mixture F sweeps across a transparent disc 12 on the surface of the ascending part 9a. The disc 12 may be positioned in the surface such that it is flush therewith, or it may be raised above the surface so that it can be cleaned more easily, or it may be countersunk relative to the surface for the purpose of protection. In the embodiment shown, the head H comprises, optionally, an analysis computer 13 and, in addition, a package consisting of at least one battery 14 and a Bluetooth or WiFi transmitter module 15. The battery 14 is either replaceable or rechargeable.

Figure 3:
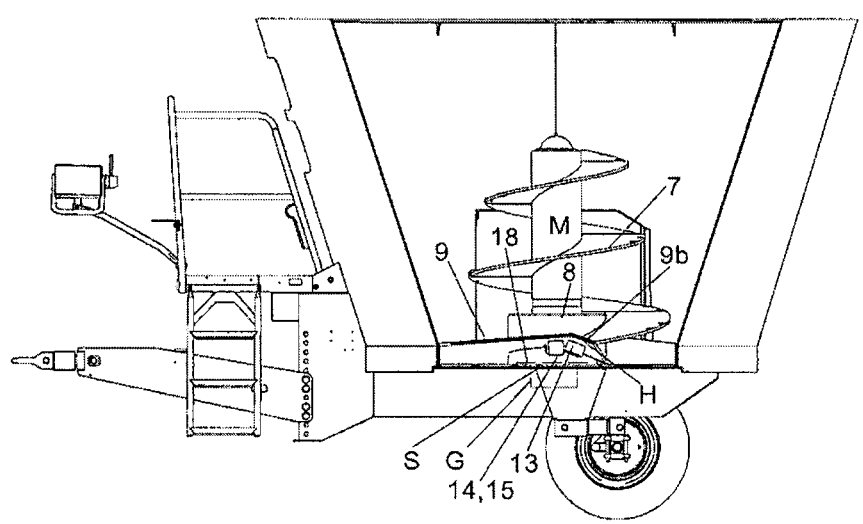
FIG. 3 shows a section of a further embodiment, in which the positioning of the head of a sensor system has been changed.

For recharging the battery, the fodder mixing wagon 1 may have provided thereon a generator G according to FIG. 3, said generator G charging the battery 14 here via a slip-ring connection 18. Alternatively, the battery may be charged in a wireless fashion by means of suitable units. It will be expedient when the analysis computer 13, the battery 14 and the module 15 are located on the back facing away from the surface of the take-up plate 9 or of the agitator blade outside of the main flow of the fodder mixture during the mixing process. A wireless communication link K is provided, indicated by a broken line in FIG. 1, e.g. between the transmitter module 15 and the module 16 on or of the weighing computer 6. In the case of a wired connection, the operating current for the head H and its equipment may be supplied directly from outside via a power supply unit and also the measurement values of the head H can be transmitted in this way (e.g. in the case of stationary or automatic systems).

In FIG. 1, a loading unit for feeding the fodder components, which is optionally arranged on the mixing container 3, is indicated by a broken line at 23. However, the fodder components may also be filled into the mixing container 3 from above by a separate loading unit, e.g. a shovel or front-end loader.

The sensor system S expediently operates with near-infrared light (NIR) radiated from the head H through the disc 12 into the interior of the fodder mixture F. For determining the fodder values, at least part of said light is reflected through the disc 12 to the head H, e.g. with the aid of optical units that are not highlighted in detail, and the light wave spectrums of said light are evaluated.

As regards the mixing accuracy, a further head H' (FIG. 5, 6) with image processing may be operated as a separate mixing accuracy sensor on the mixing device M, alternatively in a different embodiment, even according to a magnetic resonance principle.

Figure 2:
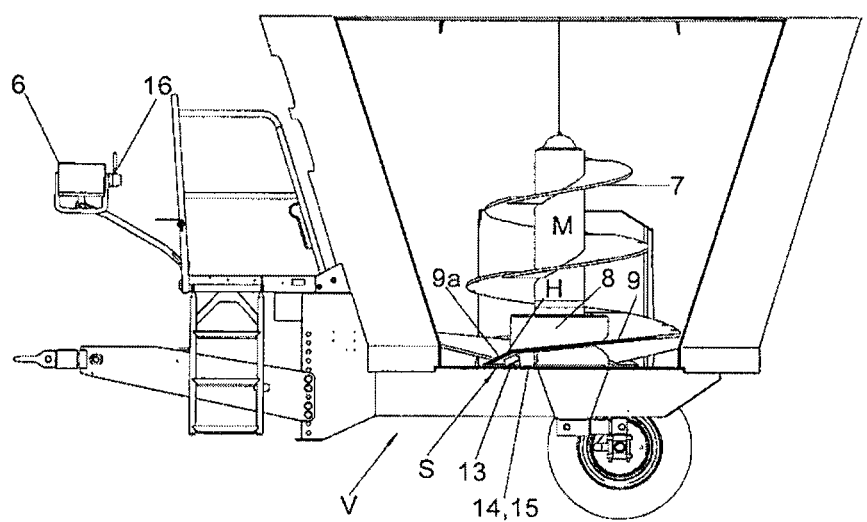
FIG. 2 shows a section, according to FIG. 1, of a modified embodiment.

FIG. 2 illustrates a rotary position of the mixing device M a short distance before the rotary position according to FIG. 1 and shows the head H in the ascending part 9a, the components 13, 14, 15 located below the ascending part 9a of the take-up plate 9 being here accommodated such that they are better protected.

FIG. 3 illustrates, at the same rotary position of the mixing device M as in FIG. 1, a positioning of the head H in the area of the descending part 9b of the take-up plate 9 or the agitator blade.

Figure 4:
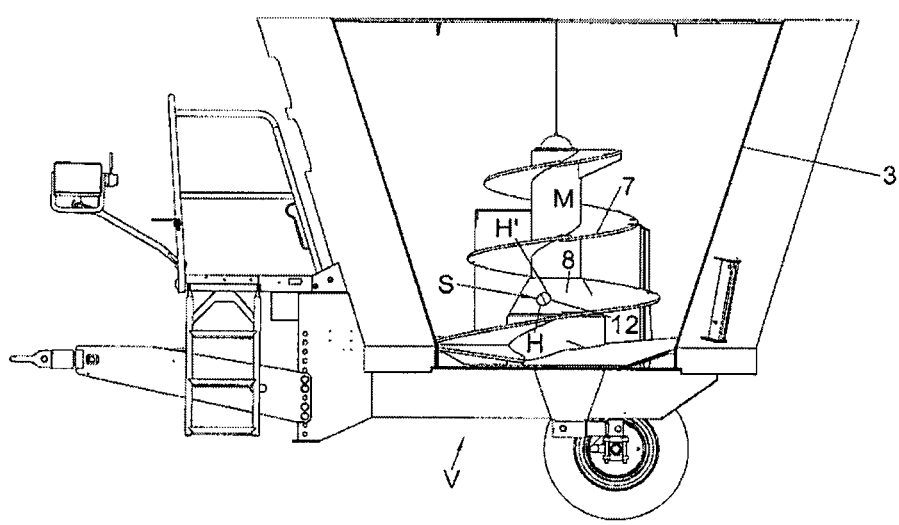
FIG. 4 shows a section of a further embodiment, in which the positioning of the head has been changed.

FIG. 4 illustrates a position of the head H in a part of the core tube 8, said part being here e.g. conical, just above the not-shown gear mechanism of the mixing screw, i.e. slightly further up than in FIGS. 1 to 3 but as low as possible for guaranteeing contact with the fodder mixture F even if the mixing container 3 should contain only a small amount of fodder mixture F.

Figure 5:
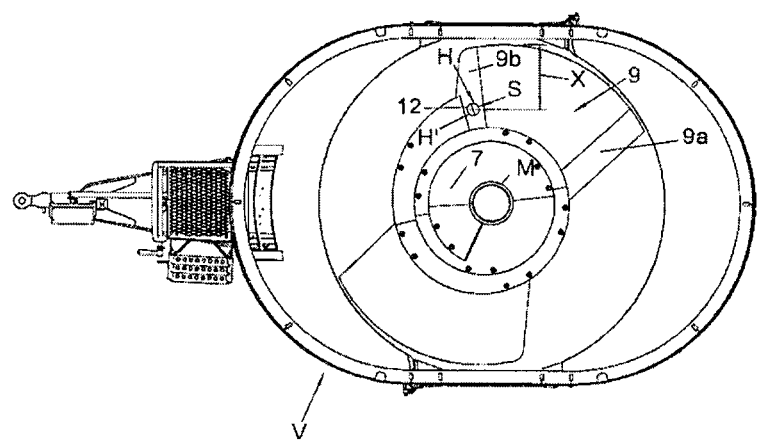
FIG. 5 shows a top view for illustrating the positioning of a head.

FIG. 5 illustrates, in a top view, the positioning of the head H of the sensor system S, approximately according to FIG. 3, on part 9b of the take-up plate 9 or the agitator blade. The radial distance x between the head H and the maximum diameter of the mixing device M may amount to approximately one third of the maximum diameter. In the case of separate heads H, H' (or separate sensor systems S) for the fodder values and the mixing accuracy, it will be expedient to either combine these separate heads H, H' or separate sensor systems S or to position them close to one another.

FIG. 6 illustrates in a perspective view of the mixing device M the position of the head H of two heads H, H', approximately according to FIG. 1, at the center of the circumference of the take-up plate 9, i.e. in part 9a of the latter ascending in a direction opposite to the direction of rotation.

In the case of cloud computing, which has been mentioned hereinbefore as a possible example, the sensor system S will communicate, e.g. via Bluetooth or WiFi, with the weighing computer 6. In the fodder mixture F comprising initially the first loaded fodder component, fodder values are determined and then transmitted to the cloud by the module 6. The cloud has stored therein e.g. algorithms with the aid of which an analysis result can be calculated and retransmitted to the weighing computer 6, which will then determine the amount of the first fodder component to be added or of the next fodder component(s) to be loaded, and supervise the loading. When the completed fodder mixture F has been analyzed, this sequence of steps will be repeated until the next fodder component is loaded and so on.

In any case, the head H or H' should be positioned such that, during the mixing process, it will either be in close contact with the fodder mixture F or view the interior thereof while fodder values and/or the mixing accuracy are being determined. In this respect, it will be of advantage when the disc 12 occupies an oblique position in space because the fodder mixture will apply sufficient pressure to the disc 12 and will be able to provide a self-cleaning effect.

It goes without saying that other means may be provided in the fodder mixing wagon, e.g. a spraying unit or a wash system, so as to keep the disc 12 clean and/or prevent sticky silage components (e.g. sugar) from settling on the transparent disc 12.

What is claimed is:

1. A fodder mixing wagon, comprising:
a mixing container containing at least one mixing device, which is adapted to be rotatingly driven in a mixing process of at least two fodder components at least up to a predetermined mixing accuracy of a fodder mixture, and at least one electronically operable sensor system having at least one head and used for determining fodder values of at least one of the at least two fodder components in the interior of the fodder mixture, wherein the head of the at least one electronically operable sensor system, operable as a combination sensor system for determining fodder values of the fodder mixture and for determining the mixing accuracy in the fodder mixture, is arranged on or in the at least one mixing device.

2. The fodder mixing wagon according to claim 1, wherein:
the at least one electronically operable sensor system is an NIR sensor system responding to reflected NIR light waves.

3. The fodder mixing wagon according to claim 1, wherein:
the at least one head of the at least one electronically operable sensor system, which is preferably equipped with an analysis computer and a battery, is connected, via a Bluetooth or WiFi transmitter module arranged near or in the at least one head and a wireless radio signal link, preferably a Bluetooth or WiFi connection, to a Bluetooth or WiFi receiver module positioned outside the mixing container, the a Bluetooth or WiFi receiver module communicating with a cloud.

4. The fodder mixing wagon according to claim 3, wherein:
the battery is either replaceable or rechargeable, preferably via a slip-ring connection and a generator arranged on the fodder mixing wagon, or in a wireless fashion.

5. The fodder mixing wagon according to claim 1, wherein:
the at least one electronically operable sensor system is linked to a computerized control and/or a weighing computer, and that, via the control and the weighing computer, respectively, amounts and/or types of fodder to be loaded can be adapted to the fodder values determined during the mixing process of mixed fodder components.

6. The fodder mixing wagon according to claim 5, wherein:
during the mixing process, the respective determined fodder values in the fodder mixture can be compared, via the control and the weighing computer, respectively, with measurement data of the weighing computer representative of the amount of the fodder mixture contained in the mixing container.

7. The fodder mixing wagon according to claim 1, wherein:
the fodder mixing wagon equipped with the at least one electronically operable sensor system is part of an automatic feeding system which is controllable at least on the basis of the fodder values and/or the mixing accuracy ascertained during the mixing process.

8. The fodder mixing wagon according to claim 1, wherein:
the at least one mixing device is a mixing screw with at least one bottom-side take-up plate or an agitator blade, a screw helix and, preferably, a screw core tube, and that the at least one head of the at least one electronically operable sensor system, preferably with a battery and a transmitter module, is arranged on the at least one bottom-side take-up plate or the agitator blade or on the screw helix or on the screw core tube, preferably in an area beginning close to a bottom of the mixing container and extending over a lower third of the mixing screw height.

9. The fodder mixing wagon according to claim 1, wherein:
the at least one head of the at least one electronically operable sensor system includes a transparent disc, preferably made of glass, acrylic glass or bullet-proof glass, which is flush with or countersunk relative to or raised above a surface contacted by the fodder mixture on a measuring site, and that a battery and a transmitter module are arranged near the measuring site on a back of the at least one mixing device or of a container wall or of the bottom facing away from the surface.

10. The fodder mixing wagon according to claim 8, wherein:

the at least one head of the at least one electronically operable sensor system is spaced apart from a maximum outer diameter of the mixing screw at a distance corresponding to a distance that corresponds to approximately one third or more of the maximum outer diameter.

11. The fodder mixing wagon according to claim 8, wherein:
the at least one electronically operable sensor system is arranged in an ascending or a descending part of the at least one bottom-side take-up plate or of the agitator blade.

12. The fodder mixing wagon according to claim 1, wherein:
the fodder mixing wagon comprises, near the mixing container, weighing cells linked to a weighing computer, at least one discharge opening provided in a container wall and adapted to be exposed by a displaceable closure, and, preferably, a fodder-component loading unit for self-loading, the fodder mixing wagon being adapted to be used in a self-propelled, self-loading, stationary or pushed or pulled fashion.

13. A fodder mixing wagon comprising:
a mixing container containing at least one mixing device, which is adapted to be rotatably driven in a mixing process of at least two fodder components up to a predetermined mixing accuracy of a fodder mixture, and at least one electronically operable sensor system having at least one head and used for examining the fodder in the interior of the fodder mixture, wherein, a head of a fodder-value sensor system and/or a head of a mixing-accuracy sensor system is/are arranged on or in the mixing device for rotation together with the mixing device.

14. The fodder mixing wagon according to claim 13, wherein:
by means of the at least one electronically operable sensor system, the mixing accuracy is determinable on a basis of fodder values determined by means of the head of the fodder-value sensor system, or by means of a further head.

15. The fodder mixing wagon according to claim 13, wherein:
the at least one electronically operable sensor system is an NIR sensor system responding to reflected NIR light waves.

16. The fodder mixing wagon according to claim 13, wherein:
the at least one head of the at least one electronically operable sensor system, which is preferably equipped with an analysis computer and a battery placed on or in the mixing device, is connected, via a Bluetooth or WiFi transmitter module arranged near or in the at least one head and a wireless radio signal link, preferably a Bluetooth or WiFi connection, to a Bluetooth or WiFi receiver module positioned outside the mixing container, a Bluetooth or WiFi receiver module communicating with a cloud.

17. A fodder mixing wagon for mixing at least two different fodder components so as to obtain a predetermined fodder mixture comprising:
a mixing container;
a rotating mixing device placed within said mixing container;
a sensor system having an analysis computer;
a head coupled to said sensor system, said head placed on said rotating mixing device within said mixing container, wherein said head senses fodder values and quantitatively identifies each of the fodder components of the at least two different fodder components during mixing of the at least two different fodder components by said rotating mixing device, and
wherein the analysis computer determines the accuracy of the fodder components compared to the predetermined fodder mixture and calculates a quantity of an additional fodder component required to obtain the predetermined fodder mixture and detects a homogeneous distribution of the at least two different fodder components.

\* \* \* \* \*